July 1, 1958     J. KALSEY     2,841,170
EMERGENCY SHUT-OFF FOR HOT WATER HEATERS
Filed May 14, 1957     2 Sheets-Sheet 1
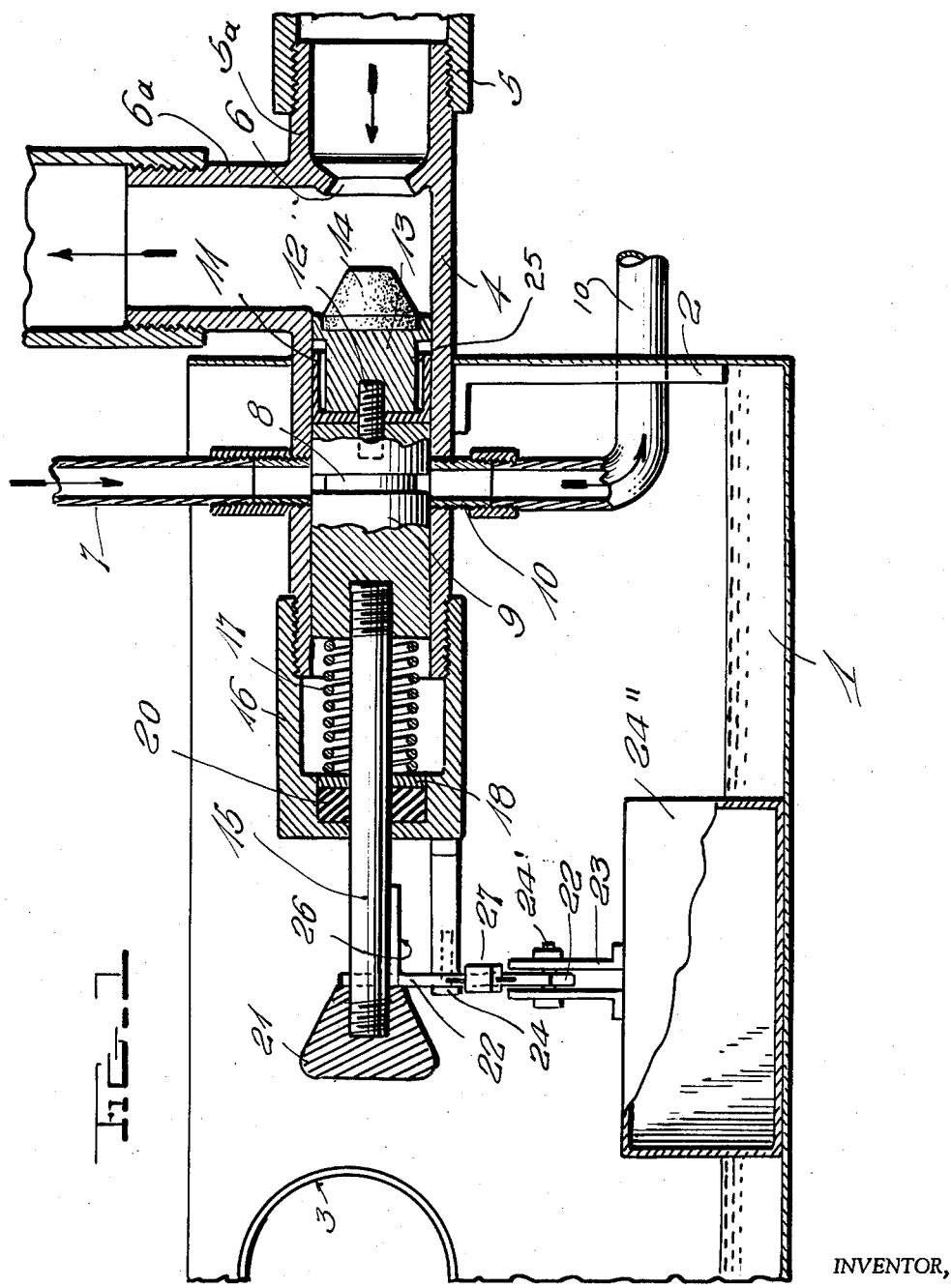
INVENTOR,
JOHN KALSEY,
BY *E.C.Vrooman & Co.*
ATTORNEYS

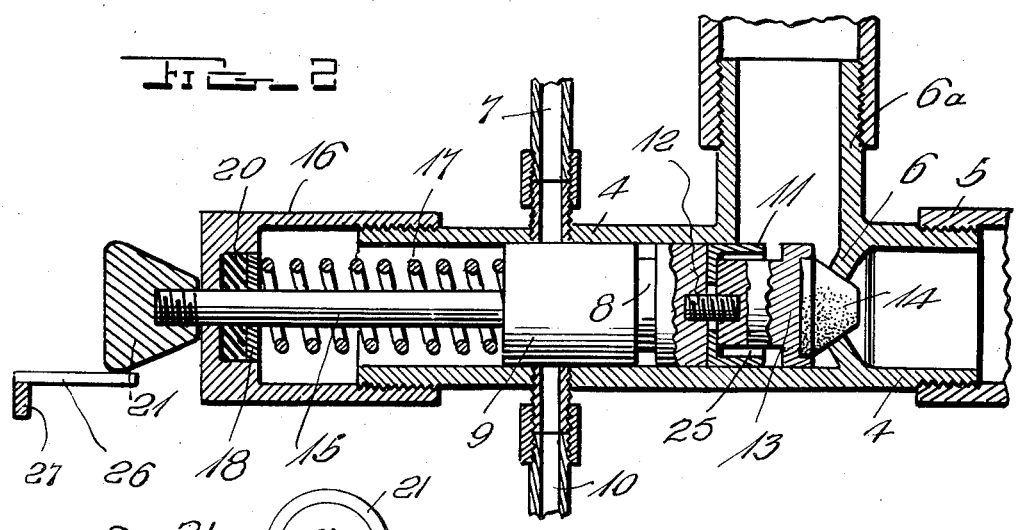
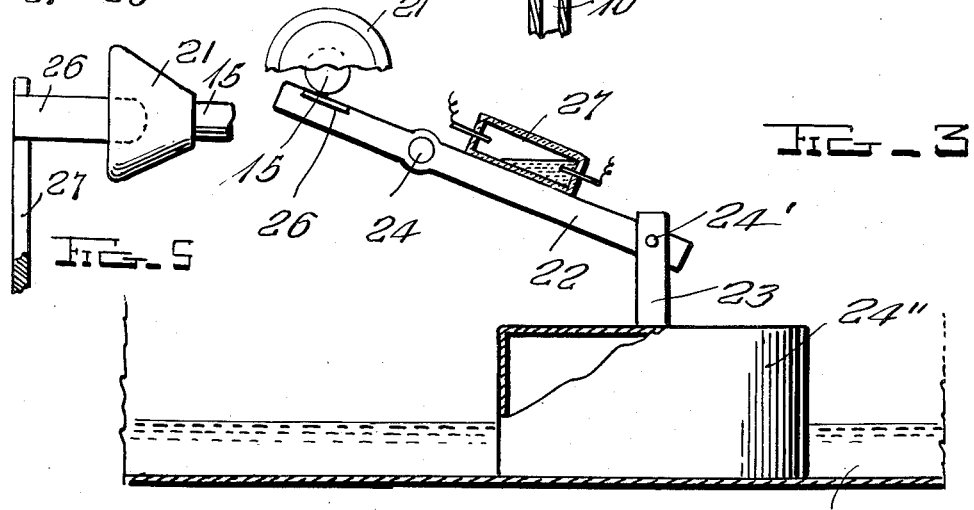
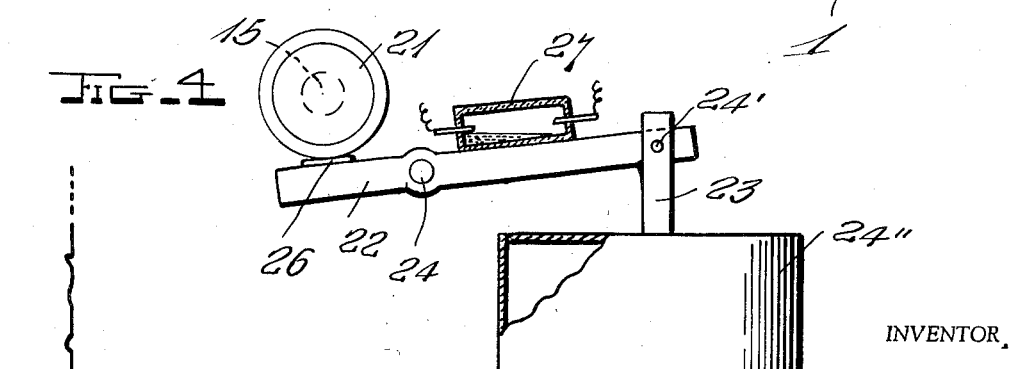

2,841,170
EMERGENCY SHUT-OFF FOR HOT WATER HEATERS

John Kalsey, Menlo Park, Calif.

Application May 14, 1957, Serial No. 659,096

5 Claims. (Cl. 137—410)

This invention relates to an emergency shut-off mechanism for hot water heaters.

An object of this invention is to provide novel means to shut off the water supply to a hot water heater in the event the heater develops a leak.

Another object of this invention is to provide efficient means for simultaneously shutting off the gas supply to a water heater when the water supply is shut off, so as to prevent any heating of the water still in the tank.

A further object of this invention is to confine any water which has leaked out to a secondary reservoir or pan and also provide an overflow from said pan to the outside of the premises so no damage will occur to said premises in the event the leak is a major one.

With the foregoing and other objects in view, this invention comprises certain novel constructions, combinations, and arrangements of parts as will be hereinafter fully described, illustrated in the accompanying drawings, and more particularly pointed out in the appended claims.

In the drawings:

Figure 1 is a longitudinal central sectional view of a mechanism constructed in accordance with the present invention.

Figure 2 is a fragmentary longitudinal sectional view of the mechanism showing the parts in a closed position.

Figure 3 is a fragmentary sectional view showing particularly the float and mercoid switch in a closed position, while Figure 4 is a fragmentary view showing the parts in an open position.

Figure 5 is a fragmentary view showing the lip under the knob, illustrating the valve in an open position.

Referring to the drawings by numerals, 1 designates a pan or tank to the inside of which is suitably secured a bracket 2. The pan or tank 1 is provided on its side wtih an overflow opening 3 (Fig. 1).

Fixedly mounted on bracket 2 is a horizontal elongated casing 4. This casing 4 is provided with a water supply pipe 5 (Fig. 1), which is threaded upon the end of the casing 4. In the casing 4, contiguous to pipe 5, is a valve seat 6 for the purpose hereinafter described.

The casing 4 is provided with a gas supply pipe 7, the inner end of which pipe 7 normally registers with the annular slot 8, which slot 8 is formed in the valve body 9 that is slidably mounted in elongated casing 4. Gas is discharged from the annular slot 8 through the pipe 10.

A cup-shaped washer 11 is placed against the outer end of the valve body 9 and is held in such position by means of a threaded unit 12 that extends, at its outer end, through said cup-shaped washer and into the head 13. Seated in the outer face of head 13 is a conical-like plug 14 which plug is adapted to fit the bevelled seat (Fig. 2).

Extending from the rear end of valve body 9 is a rod-like stem 15 which is threaded at its inner end into the valve body 9. On the inner end of the casing 4 is threaded a cap 16 and on said stem within the cap 16 is a strong coil spring 17. A flat washer 18 is seaed at its edges in a pocket, which pocket contains a rubber packing 20 (Fig. 1). The outer end of the coil spring 17 presses against the washer 18. On the outer end of rod-like stem 15 is a detachable grip 21, which may be used for manually resetting the mechanism.

In the open position, the valve body 9 is held by the float arm 22 resting against the grip or knob 21. The flat arm 22 mounted on bracket 23 is kept in this position by the weight of the float 24″ and also by the pressure created by the coil spring 17. The float arm is pivotally mounted at 24 upon the bracket 23, as shown.

When in the open position water may pass through extension 5a, on which pipe 5 is mounted, and through the extension 6a, as indicated by the arrows, and gas may pass through the annular slot 8. The cup-shaped leather washer 11 will be pressed against the valve body 9 by water pressure entering through the recess 25, thereby preventing water from passing beyond this point. The same seal will prevent gas, from the annular slot 8, passing beyond this seal. The packing 20, held in place by washer 18, will prevent gas leakage at this point.

When water enters the pan or tank 1, the weight of the float is reduced and the water will force the float arm 22 up until the friction of the arm against reset knob or grip is nullified. The spring 17 will then close the valve. The bevelled surface of the reset knob or grip 21 is designed as shown so that no part of the grip can re-engage the float arm, which might prevent its closing. In the closed position, the rubber conical-like plug 14 will be forced into the valve seat 6 and the annular slot or groove 8 will slide past the inner end of the gas pipe 7.

If the heater is heated by electrical elements, the control mercoid switch 27 (Figs. 3 and 4) disconnects the circuit when the float arm (Fig. 3) is raised. This switch is kept closed by being in the sloping position as shown.

In electric heaters the lip 26 attached to the float arm 22 rides under the reset knob or grip 21. The reset knob or grip 21 will depress the upper part of the float arm 22 so that it will assume a more or less horizontal position and cause the mercoid switch 27 to break the circuit. The reason for this is that frequently it happens that when the water is shut off the leaks may stop through the creation of a vacuum in the water tank. In this case, sufficient water may not have raised the float enough to trip the switch.

Referring to the drawing, Fig. 1, the knob 21 at the narrow end has a diameter slightly larger than the stem 15 which creates a small ridge against which the float arm rests when the valve is in the open position and thus locks the valve in the open position. When the weight of the float is reduced slightly and has started an upward motion, the float arm will be removed from this small ridge, the spring 17 will snap the valve shut by virtue of the fact that the bevelled surface of the knob 21 has no stopping or braking power once the flat arm has been released from the ridge. This is rather important because the action of the valve spring, plus the bevelled side of the knob will effectively raise the float even though very little water may be present in the pan.

While I have described the preferred embodiment of this invention and illustrated the same in the accompanying drawings, certain minor changes or alterations may appear to one skilled in the art to which this invention relates during the extensive manufacture of the same, and I, therefore, reserve the right to make such changes or alterations as shall fairly fall within the scope of the appended claims.

What I claim is:

1. In a mechanism of the class described, the combination of an elongated casing, a valve body slidably mounted within said casing, a rod-like stem screwed at one end into said valve body, said casing provided with a detachable cap at one end and surrounding said rod-like stem, a coil spring on said rod-like stem, said cap being provided with a packing therein at one end, a washer fitting entirely within said cap and being positioned against said packing, said rod-like stem provided with a conical-like plug on its outer end, a float under said conical-like plug, a bracket on said float, a float arm mounted on said bracket, and said arm being positioned close to said rod-like stem and adapted to contact said stem to lock said stem against movement.

2. In a mechanism of the class described, the combination of an elongated casing provided at one end with a removable cap, a slidable valve body provided at one end with a valve-closing plug mounted in said casing, a rod-like stem connected to said valve body, means for operating said rod-like stem, said valve body provided with an annular slot and said casing provided with gas supplying means and with an exhaust both registering with said annular slot, a cup-shaped washer detachably fastened to said valve body, and means for contacting said stem to lock the stem against movement.

3. In a mechanism of the class described, the combination of an elongated casing provided at one end with a removable cap, a slidable valve body provided at one end with a cup-shaped washer, a head provided with a conical-like plug partly positioned within said cup-shaped washer, a detachable threaded unit securing said cup-shaped washer and head to the outer end of said valve body, a rod-like stem extending from one end of said slidable valve body, a float positioned beneath said rod-like stem, and means controlled by said float to contact said stem to lock the stem against movement.

4. In a mechanism of the class described, the combination of an elongated horizontal sectional casing, a spring-pressed slidable valve body in said casing, said casing provided with an inlet and outlet passage, a valve body slidably mounted within said casing, said valve body provided with an annular slot for receiving a gas supply, said casing provided with means registering with said annular slot for the escapement of gas from said casing, a rod-like stem extending from one end of said valve body, a cone-like grip detachably mounted on the outer end of said stem, a float under said stem, a float arm and means mounting said arm upon said float, the outer end of said float arm positioned continguous to said stem, and means controlled by said float arm to contact said stem to lock the stem against movement.

5. In a mechanism of the class described, the combination of an enlongated-horizontal casing, a spring-pressed slidable valve body in said casing, said horizontal casing provided with an inlet and outlet passage, said valve body provided with an annular slot for receiving a gas supply, said inlet and outlet passages communicating with said annular slot, a washer fastened to the inner end of said valve body, said casing being provided with a valve seat, said valve seat provided with an inlet and an outlet, said valve body resting on the valve seat, a plug extending from said washer and being adapted to engage said valve seat, a stem extending from said valve body, and means to contact said stem to lock the stem against movement.

References Cited in the file of this patent

UNITED STATES PATENTS

| 770,845 | Davis | Sept. 27, 1904 |
| 2,730,122 | Svirsky | Jan. 10, 1956 |

FOREIGN PATENTS

| 23,747 | Great Britain | of 1893 |
| 906,432 | France | of 1945 |